3,051,681
PROCESS FOR INHIBITING CRYSTALLIZATION OF THE DIGLYCIDYL ETHER OF BISPHENOL A COMPRISING INCORPORATING THEREIN AN EPOXYLATED NOVOLAK RESIN, AND COMPOSITION OBTAINED THEREBY

Alexander M. Partansky, Concord, Calif., assignor to The Dow Chemical Company, Midland, Mich., a corporation of Delaware
No Drawing. Filed Oct. 29, 1959, Ser. No. 849,446
3 Claims. (Cl. 260—43)

This invention relates to liquid epoxy resins and to methods for preventing the crystallization of such resins.

The diglycidyl ether of bisphenol A (bisphenol A is chemically identified as 2,2-bis(4-hydroxyphenyl)propane) is one of the most useful of the liquid epoxy resins. As it is produced commercially it is first obtained in an impure form containing 5–10% of various impurities such as incompletely reacted bisphenol A, products of side reactions and polymers. This crude resin is ordinarily liquid and has little or no tendency to crystallize at ambient temperatures. When it is refined to a higher and higher degree of purity the viscosity of the product is lowered and the heat distortion temperature properties of its cured compositions are improved, but there is reached a point beyond which there is an increasing tendency for the resin to crystallize. Such crystallization is undesirable because while the crude liquid resin can be poured or pumped and also mixed with curing agents and other materials directly, the more desirable refined resin, when crystallized, first must be heated to melt it and to convert it into the easy-to-handle liquid.

It is an object of this invention to provide a means for preventing crystallization of the purified diglycidyl ether of bisphenol A and similar epoxy resins. Another object is to provide epoxy resins having substantially all the desirable characteristics of the pure diglycidyl ether of bisphenol A including its lower viscosity and higher heat distortion temperature properties of the cured compositions without having its tendency to crystallize under normal storage conditions. Other objects will appear hereinafter.

According to the invention, the crystallization of highly purified diglycidyl ether of bisphenol A is inhibited by the incorporation into the ether of a few percent of the polyglycidyl ether derived from a novolak resin containing about 2–5 phenolic groups. A novolak resin of the lowest possible molecular weight made by condensing phenol with formaldehyde under the usual reaction conditions is methylenebisphenol and consists of a mixture of two or more of the possible isomers. Such a mixture is preferred for the purpose of this invention but each of the isomers, as a pure compound, is suitable. Also the presence of minor amounts of novolak resins of somewhat higher molecular weight, such as those containing 3 to 5 phenolic groups in the molecule, is not objectionable so long as they do not have objectionable color, or unduly increase the viscosity of the epoxidized product. The preferred novolak is that made from phenol and formaldehyde and having an average molecular weight of about 200–300.

The novolak, consisting largely of methylenebisphenol and/or bis(hydroxybenzyl) phenol, is epoxylated by any of the known techniques for making epoxy resins, the preferred one being condensation with epichlorohydrin in the presence of a stoichiometric amount of caustic alkali. These and other methods of making glycidyl ethers are well known.

In practicing the invention it has been found that the incorporation of about 2–10% of the above-defined epoxidized novolak into the diglycidyl ether of bisphenol A prevents crystallization of the latter under normal ambient temperature storage conditions. When the latter is to be stored for long periods at abnormally low temperatures it may be found necessary to use more than 10% and up to 20% of the epoxidized novolak resin to prevent crystallization.

The practice of the invention is illustrated by the following example.

Example

A sample of diglycidyl ether of bisphenol A having a Brabender viscosity of 72 poises was divided into four parts.

A sample of epoxylated novolak resin was prepared consisting predominantly of the diglycidyl ether of o,o'-methylenebisphenol and containing minor amounts of the o,p'- and p,p'-isomers as well as analogous compounds containing more than two phenol residues per molecule. It contained an average of 2.2 phenol residues per molecule and had a Brabender viscosity of 1030 poises. Into the four samples of the first resin was put 0, 5, 10 and 20%, by weight, of the second resin and the two were thoroughly mixed. The four samples were then stored at normal room temperature. Inspection at the end of five months showed that the sample containing none of the epoxylated novolak resin was completely solidified by crystallization; that containing 5% contained a few small crystals, estimated to amount to less than 1% of the samples; that containing 10% contained only traces of small crystals; while that containing 20% was entirely free of crystals.

All the samples were then warmed to 50° C. until all crystals had disappeared and again stored at room temperature. After one month it was found that the one containing no epoxylated novolak resin was about 40% crystallized, whereas all the others were completely free of crystals.

Because of the close similarity in chemical structure, reactivity and physical properties between the diglycidyl ethers of bisphenol A and methylenebisphenol, the addition of up to 20% of the latter to the former has little or no significant effect on the properties of the cured epoxy resin made therefrom.

As an illustration of the great decrease in viscosity that can be achieved in an epoxy resin by purification, it has been found that a typical sample of commercial diglycidyl ether of bisphenol A has a viscosity at 25° C. of about 240 poises and that the highly purified compound has a viscosity of only about 72 poises. The latter readily crystallizes but when mixed with 5, 10 and 20% by weight of diglycidyl ether of methylenebisphenol has no tendency to crystallize and has a viscosity of 80, 90 and 130 poises, respectively. (All viscosities were measured with a Brabender viscosimeter.)

I claim:

1. An epoxy resin composition consisting essentially of the diglycidyl ether of 2,2-bis(4-hydroxyphenyl)propane and a minor proportion, sufficient to inhibit crystallization, of an epoxylated novolak resin, said novolak resin, before epoxylation, containing 2 to 5 phenolic groups and consisting predominantly of methylenebisphenol.

2. A process for inhibiting the crystallization of the diglycidyl ether of 2,2-bis(4-hydroxyphenyl)propane comprising incorporating into the ether a minor but effective proportion of an epoxylated novolak resin, said resin, before epoxylation, containing 2 to 5 phenolic groups and consisting predominantly of methylenebisphenol.

3. An epoxy resin composition consisting essentially of the diglycidyl ether of 2,2-bis(4-hydroxyphenyl)propane and 2–10% of epoxylated novolak resin, said novolak resin, before epoxylation, containing 2 to 5 phenolic groups and having an average molecular weight of about 200–300.

References Cited in the file of this patent

UNITED STATES PATENTS 2,682,515   Naps  ---------------- June 29, 1954
2,735,829   Wiles et al.  ------------ Feb. 21, 1956
2,854,427   De Groote et al.  -------- Sept. 30, 1958

OTHER REFERENCES

Lee et al.: "Epoxy Resins," McGraw-Hill (1957), pages 18–20.